March 30, 1971    S. JEFFEE    3,573,047
TECHNIQUE FOR AVOIDING DAMAGE TO FILM
AND THE LIKE BY FOREIGN OBJECTS
Filed June 27, 1967

United States Patent Office 3,573,047
Patented Mar. 30, 1971

3,573,047
TECHNIQUE FOR AVOIDING DAMAGE TO FILM AND THE LIKE BY FOREIGN OBJECTS
Saul Jeffee, Scarsdale, N.Y., assignor to Movielab, Inc., New York, N.Y.
Filed June 27, 1967, Ser. No. 649,298
Int. Cl. G03c 5/26, 3/02, 1/76
U.S. Cl. 96—50                    12 Claims

ABSTRACT OF THE DISCLOSURE

Foreign objects which might be trapped between a film and its guide roller are voided by providing suitable holes in the film or a leader which any such objects can drop through. This avoids damage to the film.

DRAWING

FIG. 1 diagrammatically illustrates the processing of a film and the environment for the problem which the invention overcomes;

DETAILED DESCRIPTION

Figure 1:
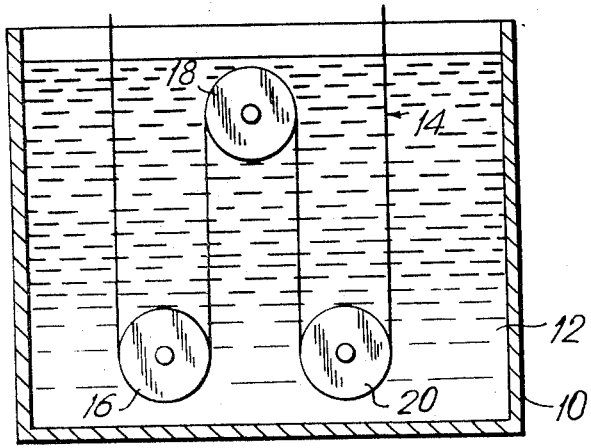

This invention relates to the processing of continuous films of any width or material as to which damage by foreign objects would be detrimental. The invention particularly relates to films such as photographic positive rawstock or negative films and the like but also relates in a more general sense to continuous lengths of material guided over or under rollers or the like in such a manner that it is possible for foreign objects to be trapped therebetween.

Since the invention will be more easily understood from a specific example, attention is directed to the case of a photographic film which is being processed. This film will be passed through photographic solutions along a tortuous path which is defined by a multitude of rollers possibly numbering, in commercial installations, in the hundreds.

In an installation of the above-noted type, it sometimes happens that a foreign object such as a loose metal screw, nut or filing falls into the apparatus. When this happens, hundreds and even thousands of feet of film can be ruined before the problem is discovered. This alone results in economic losses which cannot be sustained in any competitive industry.

In addition, however, the source of the trouble usually cannot be rapidly discovered because there are so many rollers involved, because the photographic solutions must be drained, because the working quarters are so cramped and so forth. Therefore, further economic losses are involved due to down time and to the labor involved. Furthermore, where rapid service is required, such delays sometimes result in loss of business as well as financial loss.

It is accordingly an object of the invention to avoid or minimize the above-noted problem not only as relates to the continuous processing of photographic negatives and prints but also as relates to all types of photographic rawstock or other films of various types of materials.

To achieve the above and other of its objectives the invention contemplates a very simple technique which is so simple as to afford a great economy of application, labor and cost. More particularly, it is contemplated within the scope of the invention that the film which is to be protected against damage by foreign objects be so protected simply by placing at one end thereof at least one hole in substantially central location such that foreign objects which ordinarily might be trapped between the film and the roller beneath which the film passes, may drop through such hole under the influence of gravity. Within the broad scope of the invention any such use of a hole or opening is contemplated. However, in accordance with preferred embodiments of the invention, the hole will have a certain size relative to the associated film and will moreover be located in a particular manner as will be described in greater detail hereinafter. In addition, the hole may be reinforced by the use of an eyelet or the like, and in fact the hole may be part of a metal leader which is fabricated in a ladder-like manner so as to have a plurality of such holes. Still further, the hole may be provided in a variety of configurations and distributions as will appear hereinafter in greater detail.

It is moreover contemplated within the scope of the invention that an article of manufacture be provided comprising either the film itself formed with escape holes, or in the style of a leader which is to be attached to any film bearing photographic information or the like and which leader is designed to afford the protection noted hereinabove.

The invention will be more clearly appreciated from the illustration of the aforenoted drawing, reference next being made to FIG. 1 thereof.

In FIG. 1 is shown a vat 10 in which is accommodated a fluid 12. This fluid may be a developing fluid, or any other medium, the purpose of which is to process in one way or another the film 14 passing in tortuous manner through the vat for purposes of one of a wide variety of purposes. To define the tortuous path there are provided a multitude of rollers of which appear rollers 16, 18 and 20.

Film 14, by way of example, passes beneath the roller 16 and thereafter over the roller 18 and under the roller 20. In the normal commercial installation hundreds of such rollers may be provided and, in fact, the number of rollers may sometimes be in the thousands.

Figure 2:
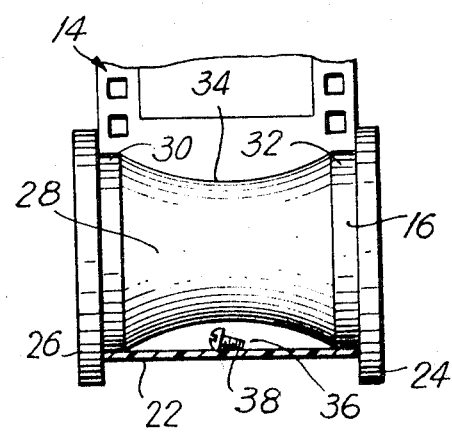
FIG. 2 illustrates a roller under which passes a film and the manner in which a foreign body can be trapped.

FIG. 2 illustrates a single roller such as, for example, the roller 16. The film 14 passes beneath the roller 16, as indicated at 22, which is exemplary of a great number of rollers at which this situation exists.

The roller 16 has two end flanges 24 and 26 in the normal construction, and has a central spool portion 28 provided with two lands 30 and 32 between which is located a concavity 34. The lands and concavity operate such that the film is engaged along its lateral edges only so that no damage results to the information area of the film from contact with the spool portion 28 of the roller.

Because of the provision of the concavity 34 there comes to be defined between the film 14 and the concavity an opening 36 in which may be trapped a foreign object such as indicated at 38 by way of example. The problem can also arise in connection with other types of rollers which do not have concavities such as flat rollers. This foreign object may be constituted by a loose metal screw, nut or filing, or any hard or semi-hard object which when engaging with the film 14 may cause a scratch or other such damage thereto. The nature of the foreign object is not important to an appreciation of the invention, but it is essential to appreciate that such foreign objects are in a commercial installation very difficult to locate in view of the multitude of rollers which are employed.

In accordance with the invention there will be provided in the film 14 at least one opening such that when the opening passes beneath any of the rollers, any foreign object trapped between the film and the related roller (with or without concavity) may readily pass through the hole or opening and drop under the influence of gravity to a position at which it can do no harm to the film being processed. In other words, the foreign object is voided by means of an opening provided in the film which permits the foreign object to escape.

Figure 3:
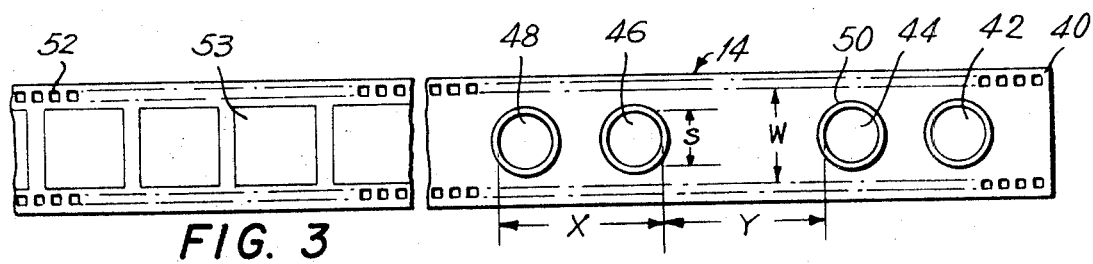
FIG. 3 illustrates a film portion embodying the improvement of the invention.

FIG. 3 illustrates one embodiment of the invention in which a plurality of openings are provided in the film itself at the leading end 40 thereof. The openings appear at 42 and 44 constituting one pair and at 46 and 48 constituting a second pair, there being provided as many openings as are essential to the voiding of foreign objects.

It is of course essential that the openings be provided in the film in such a manner as not to weaken the film so that the film is not destroyed during the processing thereof. One manner of avoiding a weakening of the film is to reinforce the edges of the holes or openings by means of grommets or eyelets 50. These grommets or eyelets may be fabricated of metal or plastic and may be provided in conventional manner.

The size of the openings is generally related to the width of the film and since the film is generally provided with a multitude of lateral sprocket holes 52, the width of the film will generally be related to the distance between the two lateral alignments of sprocket holes, this width being indicated at W.

Regarding the relationship of the size of the openings to the width of the film, this size is generally indicated at S in FIG. 3 and in the illustrated case also corresponds to the diameter of each of the respective holes.

The distance S will in accordance with the preferred embodiment of the invention constitute about 40–95% of the width W of the film. Under the usual practical circumstances involved, this has been determined sufficient for the voiding of foreign objects while at the same time permitting the film to retain sufficient strength to enable processing thereof without encountering destruction of the film.

At the same time, the preferred embodiment of the invention will involve a longitudinal extent of the pairs of openings as indicated at X, which extent will usually and preferably lie in the range of from one to two inches.

In addition to the aforenoted characteristics, there is a preferred spacing between the longitudinally spaced units constituted by the pairs of holes or by elongated openings as will be discussed hereinafter. This preferred spacing is indicated at Y in FIG. 1 and generally and preferably lies within the range of from two to four inches.

Still one further characteristic is employed within the definition of the preferred embodiment of the invention and this involves the use of about two to three feet of leader portion for the film, which portion will pass over a given roller before the information bearing portion of the film is to be encountered. This information bearing portion of the film will be constituted by that portion of the film bearing the picture frames indicated by way of example at 53.

Figure 4:
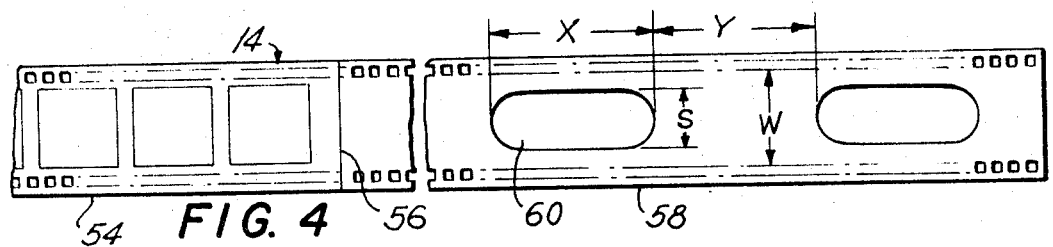
FIG. 4 illustrates a second embodiment of the invention.

FIG. 4 illustrates a further embodiment of the invention, wherein the main portion 54 of the film which constitutes the information bearing portion is connected, for example, by splicing at connection 56 to a leader 58. The leader 58 need not necessarily bear any information and may be a separate piece of film which is spliced to the main portion 54 in longitudinally aligned relationship therewith. Leader 58 can be perforated or imperforated. This film leader 58 can be provided with a series of voiding holes, as has been noted above, and the leader 58 may be a separately manufactured article which can be provided for use with films which will be subsequently attached.

In the film leader 58 illustrated in FIG. 4, there is provided a plurality of holes 60, these being elongated holes having a relationship to the width of the leader and the longitudinal length of the leader as indicated hereinabove. In other words each of the openings 60 will have a width constituting about 40–95% of the width of the leader and each of the openings 60 will preferably have a length of about 1–2 inches. The spacing between the openings 60 will preferably be within the range of from 2–4 inches.

It is to be understood that while the above dimensions are given by way of preference, that the invention is not necessarily limited in scope to these specific dimensions, as the general purposes of the invention can be achieved by the use of other limitation provided that certain sacrifices in strength of the film or leader can be tolerated.

Figure 5:
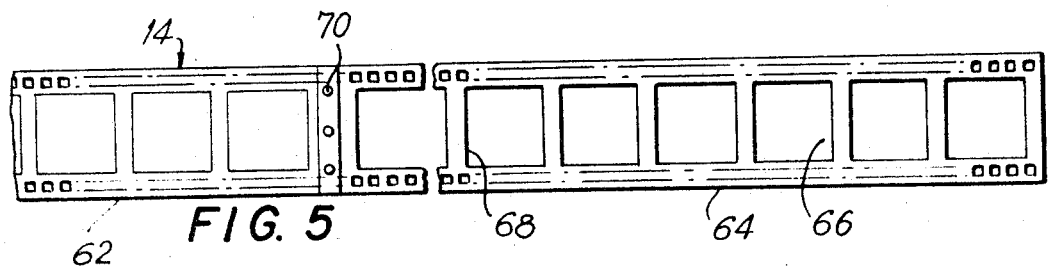
FIG. 5 illustrates a further embodiment.

A more sophisticated version of a leader which may be employed in accordance with the teachings of the invention appears in FIG. 5, wherein the film 14 is again provided with a main portion indicated at 62. In this case, however, a leader 64 is provided which is fabricated of a plastic or a suitable material such as a stainless steel or the like, the leader 64 having a ladder-like configuration such that a multitude of openings 66 result therein. The openings 66 are separated by a plurality of transverse strips 68 which give strength to the leader and avoid various of the dimensional requirements noted hereinabove. The material constituting the leader 64 will preferably be of a thickness of about .004–.005 inch and the leader 64 can be spliced to the main portion 68 by variouss means such as eyelets 70, or by means of a Mylar tape (not shown).

In general it will be observed with respect to the leader 64, as well as to the leader 58 and other embodiments herein described, that the openings can preferably be as large as possible without resulting in a collapsing of the film. The material employed may of course be the film material itself, but in any event will have to be a material compatible with the general procedure through which the film is passing. This may involve sonic cleaning machines, printing machines, loop cabinets, developing machines, and may involve continuous developing of conventional still or motion picture film.

From what has been stated above, it will be appreciated that the invention is generally applied in a photographic process wherein an elongated film is guided along a path by at least one roller, the method of the invention comprising ridding the film of loose foreign objects by placing at least one hole in the film or leader through which such objects may pass. More particularly, the invention involves passing the film beneath a roller, the hole being at least substantially centrally located relative to the width of the strip, the foreign objects dropping out under the influence of gravity. While the voiding of the foreign objects is taking place, there may be a simultaneous development of the film, or a cleaning of the film, or some other such suitable processing.

It is to be noted that the invention involves not only the process, but also an article of manufacture which may be constituted within the film being processed directly of as an attachment to such film.

There will now be obvious to those skilled in the art many modifications and variations of the procedures and structures set forth above. Such variations and modifications will not depart from the scope of the invention if defined by the following claims.

What is claimed is:

1. In a method of continuously developing an exposed elongated film by passing the same longitudinally through a processing bath, said film having a leader portion and being provided with a multitude of lateral sprocket perforations for guiding said film and wherein foreign objects capable of damaging the film are to be removed, the improvement wherein said leader portion is provided with at least one hole centrally located of the width of the film and being of such dimension that such foreign objects will pass therethrough prior to contacting the exposed film.

2. A method as claimed in claim 1 comprising passing the film beneath a roller having an annular concavity therein, said objects dropping out under the influence of gravity.

3. A method as claimed in claim 1 wherein the hole is about 40–95% of the width of the film.

4. A method as claimed in claim 1 wherein the film has sprocket perforations along both lateral edges and the hole is about 40–95% of the width of the film between said lateral perforations.

5. A method as claimed in claim 1 comprising reinforcing the hole.

6. A method as claimed in claim 1 wherein the hole is formed in a separate leader which is connected to the film.

7. A method as claimed in claim 2 wherein the hole is longitudinally extended along said film for about 1–2 inches.

8. A method as claimed in claim 2 wherein a plurality of holes is provided with a spacing of about 2–4 inches between the holes.

9. A method as claimed in claim 1 wherein the film is of photosensitive material, comprising simultaneously developing the material.

10. An elongated photographic film provided with a multitude of sprocket holes for guiding said film, said film including a leader portion and being adapted for longitudinal displacement through a processing bath in which foreign objects may be present and damage said film, the improvement wherein said leader portion is provided with at least one centrally located hole being of such dimension that said foreign objects will pass therethrough prior to contacting the film, and reinforcing means peripherally engaged in said hole.

11. The improvement claimed in claim 10 wherein the leader is of metal.

12. The improvement claimed in claim 10 wherein the leader is of film.

References Cited

UNITED STATES PATENTS

| | | | |
|---|---|---|---|
| 3,411,909 | 11/1968 | Kern et al. | 96—78 |
| 1,499,099 | 6/1924 | De Ybarrondo | 95—90.5 |
| 1,957,864 | 5/1934 | Tuttle et al. | 95—5 |

NORMAN G. TORCHIN, Primary Examiner

E. C. KIMLIN, Assistant Examiner

U.S. Cl. X.R.

86—48, 67, 78